US008588955B2

(12) United States Patent
Landgraf

(10) Patent No.: US 8,588,955 B2
(45) Date of Patent: Nov. 19, 2013

(54) METHOD AND APPARATUS FOR OPTIMIZING, MONITORING, OR ANALYZING A PROCESS

(75) Inventor: Günther Landgraf, Karlstadt (DE)

(73) Assignee: Robert Bosch GmbH, Stuttgart (DE)

( * ) Notice: Subject to any disclaimer, the term of this patent is extended or adjusted under 35 U.S.C. 154(b) by 401 days.

(21) Appl. No.: 12/492,298

(22) Filed: Jun. 26, 2009

(65) Prior Publication Data

US 2009/0326680 A1   Dec. 31, 2009

(30) Foreign Application Priority Data

Jun. 27, 2008   (DE) .......................... 10 2008 030 159
Jan. 10, 2009   (DE) .......................... 10 2009 004 285

(51) Int. Cl.
    *G05B 19/4069*   (2006.01)
    *G05B 19/42*     (2006.01)
(52) U.S. Cl.
    USPC .......................................... 700/173; 702/182
(58) Field of Classification Search
    USPC ........... 700/11, 12, 15, 17, 28, 49, 51, 83, 87, 700/88, 108, 173, 174; 702/182, 183, 188; 703/6, 13, 22; 715/771
    See application file for complete search history.

(56) References Cited

U.S. PATENT DOCUMENTS

| 5,710,709 | A * | 1/1998 | Oliver et al. .................. 700/184 |
| 6,108,662 | A * | 8/2000 | Hoskins et al. .................. 700/95 |
| 6,282,455 | B1 * | 8/2001 | Engdahl .......................... 700/83 |
| 6,546,127 | B1 * | 4/2003 | Seong et al. ................... 382/152 |
| 6,678,636 | B1 | 1/2004 | Coleman et al. |
| 6,944,584 | B1 * | 9/2005 | Tenney et al. .................... 703/22 |
| 7,055,131 | B2 * | 5/2006 | Charisius et al. ............. 717/109 |
| 7,076,322 | B2 * | 7/2006 | Chandhoke .................... 700/181 |
| 7,076,332 | B2 * | 7/2006 | Cifra et al. .................... 700/245 |
| 7,139,979 | B2 * | 11/2006 | Schultz et al. ................. 715/771 |
| 7,164,883 | B2 * | 1/2007 | Rappaport et al. ................ 703/1 |
| 7,266,476 | B2 * | 9/2007 | Coburn et al. ................ 702/183 |
| 7,680,546 | B2 * | 3/2010 | Gilbert et al. .................... 700/83 |
| 7,702,409 | B2 * | 4/2010 | Lucas et al. ....................... 703/6 |
| 7,849,416 | B2 * | 12/2010 | Chandhoke et al. .......... 715/771 |
| 7,917,863 | B2 * | 3/2011 | Chandhoke et al. .......... 715/771 |
| 7,930,643 | B2 * | 4/2011 | Chandhoke et al. .......... 715/771 |
| 7,992,129 | B2 * | 8/2011 | Chandhoke et al. .......... 700/181 |
| 2002/0123812 | A1 * | 9/2002 | Jayaram et al. .................. 700/97 |
| 2002/0126151 | A1 * | 9/2002 | Chandhoke et al. .......... 345/771 |
| 2002/0133264 | A1 * | 9/2002 | Maiteh et al. ................. 700/182 |
| 2002/0186245 | A1 * | 12/2002 | Chandhoke et al. .......... 345/764 |
| 2002/0191023 | A1 * | 12/2002 | Chandhoke et al. .......... 345/771 |
| 2003/0139848 | A1 * | 7/2003 | Cifra et al. .................... 700/245 |
| 2003/0144751 | A1 * | 7/2003 | Chandhoke et al. ............ 700/61 |
| 2003/0193522 | A1 * | 10/2003 | Chandhoke .................... 345/764 |
| 2005/0074834 | A1 * | 4/2005 | Chaplen et al. ................. 435/34 |
| 2005/0079511 | A1 * | 4/2005 | Mandema et al. ................. 435/6 |

(Continued)

*Primary Examiner* — Charles Kasenge
(74) *Attorney, Agent, or Firm* — Hodgson Russ LLP

(57) ABSTRACT

The invention presents a method and an apparatus for optimizing or monitoring or analyzing process sequences of an automated device, such that a visualization of the data sets is implemented by means of a display means 12a, b, c, with the use of at least one first and one second data set, in such a way that a visual cross-reference 15, 16 is created between dataset segments that are relevant to the process sequence. This allows the machine operator to recognize quickly those points in the process sequence where a need exists for intervention. Manufacturing costs can thereby be lowered, and product quality improved.

29 Claims, 3 Drawing Sheets

(56) References Cited

U.S. PATENT DOCUMENTS

| | | | |
|---|---|---|---|
| 2006/0098010 A1* | 5/2006 | Dwyer et al. | 345/424 |
| 2006/0150149 A1* | 7/2006 | Chandhoke et al. | 717/109 |
| 2006/0197757 A1* | 9/2006 | Holub | 345/207 |
| 2007/0132779 A1* | 6/2007 | Gilbert et al. | 345/619 |
| 2007/0179641 A1* | 8/2007 | Lucas et al. | 700/83 |
| 2008/0306620 A1* | 12/2008 | Mutscheller | 700/109 |

* cited by examiner

METHOD AND APPARATUS FOR OPTIMIZING, MONITORING, OR ANALYZING A PROCESS

CROSS REFERENCE TO RELATED APPLICATIONS

This application claims priority of German patent application no. 10 2008 030 159.0 filed Jun. 27, 2008 and German patent application no. 10 2009 004 285.7 filed Jan. 10, 2009, which are both incorporated by reference herein.

FIELD OF THE INVENTION

The invention relates to a method and an apparatus for operating an automated device, in particular for optimizing, monitoring, or analyzing a process executing on the device, in accordance with the independent claims.

The device can be, for example, a device for automation or monitoring purposes. The device could be, for example, a processing machine for processing a workpiece or for assembling workpiece components; the device could, in particular, also be a machine tool.

BACKGROUND OF THE INVENTION

Very large data volumes often need to be handled and processed in the context of the operation of processes. These data volumes must be capable of being quickly acquired and assessed in terms of their effects on the process result, for example a workpiece to be fabricated. The goal of the invention is to monitor and/or optimize and/or analyze the process with regard to a great variety of criteria such as, for example, production accuracy, production speed, energy consumption, cycle times, process stability and/or process reliability, participating intelligent subsystems, or machine components.

U.S. Pat. No. 6,678,636 B1 discloses a "cycle time analyzer" that enables monitoring of machine cycles. With this, it is possible to analyze machine conditions retrospectively. The machine operator thereby obtains a tool for discovering errors and for optimizing machine processes. This helps to reduce manufacturing costs and improve product quality. Its functionality, however, is limited to machine cycle analysis only.

SUMMARY OF THE INVENTION

The present invention proposes a method for operating an automated device, in particular for monitoring and/or analyzing and/or optimizing at least one process executing on the automated device. For purposes of the invention the term "process" can also be understood, in particular, as any controlled execution or controlled operation or the like.

Using at least one first and one second data set, a visualization of the data sets is implemented by means of a display means in such a way that a visual cross-reference is created between data-set segments that are relevant to the process. In addition to simple machine cycle analysis, further process-relevant information items that have a direct correlation with the process and can have a decisive influence on the process are thus also depicted in this context.

The display means preferably comprises multiple subregions in which a very wide variety of information items based on the data sets can be depicted. In a first region of the display means, for example, one or more control programs, optionally having additional data, could be displayed. Correspondingly, in a second region of the display means several multi-dimensional graphics could if necessary also be depicted, for example in order to visualize the process result.

This procedure allows the machine operator to recognize quickly where weaknesses exist in the process, since by means of the visual cross-reference between the data sets relevant to the process it very quickly becomes evident how the data sets mutually influence one another and how they are dependent on one another.

Usually at least one intelligent subsystem participating in the process execution is present, at least one data set being used to characterize the condition, and/or to depict at least one parameter, of the subsystem. An "intelligent subsystem" is understood as a system that is capable, for example by means of a control program, of automatically controlling subsystem-specific sequences (e.g. drive control system, control system, and the like). This makes possible a relative reference, in particular by means of a time base, between the subsystem of the relevant machine and a further process-relevant data set that can be directly or indirectly correlated with the subsystem.

In principle, of course, multiple intelligent subsystems having a common time base, which can have their own measurement recording units, can also be present. The data sets recorded thereby could likewise be visualized. It is moreover also conceivable for signals from a variety of data sets, which derive from different intelligent subsystems or from one intelligent subsystem, to be depicted in one graphic, if necessary. Multiple systems could thus, for example, be displayed on one interface in different regions.

If the further process-relevant data set preferably comprises data for visualization of the process result, then a cross-reference could, for example, be created between the process result and the subsystems used to implement the process result, in order to visualize that cross-reference by means of the display means. The data set for visualizing the process result preferably derives from a simulation utilizing a virtual device. A virtual representation of the process result can therefore first be generated, saving time and cost. Alternatively, it would also be possible for the data set to be based on measurements on a process result implemented using a real device. This measurement could, for example, represent target positions that were recorded based on the cycle timing of an interpolator of, for example, a device functioning as a machine tool, and the process result could be the workpiece that is manufactured.

The intelligent subsystem or subsystems could preferably be intelligent virtual and/or real electronic subassemblies (numerical control system, motion control system, drive, SPC, robot control system, measurement machine, tool monitoring device, etc.). These subassemblies are capable of acquiring data using a cross-subsystem and uniform time reference, storing the data, and making them available again for later evaluations. The data sets of these intelligent subsystems can then be correlated with one another using the invention presented here. In the preferred application, for example in combination with a machine tool, a numerical control system, an SPC, and multiple drives (optionally having integrated motion and/or integrated SPC) are usually present as intelligent subsystems. In this case an NC program having NC blocks serves as the control program that determines the process.

The control program involves, in particular, a DIN code for a numerical control system and/or an SPC program (in particular an SPC step sequence) and/or a robot control system or motion control system. In the context of visualization, the program code is visualized at least in part by means of the display means, in particular in the form of individual program code lines in the form of NC blocks or SPC code (e.g. steps in an SPC step sequence).

The real or virtual control system additionally or alternatively applies control to a virtual device and exchanges data sets with the virtual device; these data sets can also be taken into account in the context of visualization. Process results can thus be simulated a priori. Mixing of data sets is likewise conceivable. For example, a virtual machine having virtual drives could be connected to a real control system. Data sets from the real control system could, in this fashion, encounter data sets from the virtual drives in one visualization.

Utilization of the method according to the present invention consists in the fact that a reference is created, for example, between the process result (e.g. workpiece) and the control program or programs necessary for performing the process (e.g. manufacturing the workpiece), and optionally also the data or signals ascertained on the individual intelligent subsystems. This reference (usually a time reference using a cross-subsystem common time base) assigns individual segments of the control program, or even of multiple control programs, to specific data sets, for example a path contour (which might be produced, for example, using the target or actual positions of an interpolator). In machine tools, the workpiece is created automatically using the interpolator-side target or actual positions (assuming a Cartesian axis system). It is therefore easy to determine which control system program or which part of the control program is responsible for the creation of which paths (in the case of processing machines: which portion or segment of the relevant workpiece contour) and may need to be optimized. The benefit of the method according to the present invention is that a reference is created, for example, between the workpiece and the at least one control program necessary for manufacture of the workpiece, and the data or signals ascertained on the individual subsystems. This reference (usually a time reference using a cross-subsystem common time base) assigns individual segments of the control program, or even of multiple control programs, to specific data sets, for example a path contour (which results, for example, from a data set of the target or actual positions of a relevant interpolator). In machine tools, the workpiece is created automatically using the interpolator-side target or actual positions. It is therefore easy to determine which control system program or which part of the control program is responsible for the creation of which paths (in the case of processing machines: which portion or segment of the relevant workpiece contour) and may need to be optimized.

By preference, changes that are relevant with respect to the control program and are acquired by means of an editing device are processed in the context of the method according to the present invention in such a way that said changes can influence process execution directly and contemporaneously. Changes carried out on the control program can be carried out directly on the display means, and the control program can be executed again immediately thereafter on the control system. The effects of the changes or optimizations can thus be checked, for example on a virtually manufactured workpiece, immediately but no later than the next control program run, by examining the process result.

By preference, at least one process-relevant data set is ascertained by means of a measuring means, and collected by means of a data collection device for purposes of further processing. The user thus has the capability, in the context of the method according to the present invention, of causing process-relevant data to be acquired and depicted in controlled fashion. Flexibility for the process operator in terms of process analysis thus becomes very high.

The process operator has the capability of connecting the measuring means to any subsystems of the machine or starting it on any subsystem, and thereby storing any operating parameters in the data collection device. A prerequisite for this is a cross-subsystem common time base.

The measuring means could be used, for example, to record the motor currents of spindle motors of a machine tool within one or more drives, or even within the numerical control system. The data set acquired by means of the measuring means preferably comprises drive-relevant measured variables and/or parameters and/or control system-relevant measured variables and/or parameters such as shaft or spindle data, position data, speeds, rotation speeds, accelerations, sticking, contour errors, electrical voltage and current, mechanical torque or force and/or rotation speed or rate, communication protocol data, control channel data, and/or SPC data including I/O data (conditions of a wide variety of peripherals, for example a hydraulic unit), and the like, or data derivable or calculable therefrom such as, for example, a calculation of electrical energy from the respective electrical voltage and current. The method according to the present invention can then create and visualize cross-references between the aforesaid measured variables and, for example, a workpiece contour (normally this also involves measured variables, e.g. all the target positions of the interpolator) and/or the control program. All of these measured variables can thereby be optimized and considered in relation to the process result (e.g. workpiece) and/or the control program.

Visualization is preferably accomplished using three base signals. The term "base signals" refers to signals that are allocated to coordinate axes and can together stipulate a three-dimensional correction (e.g. for multidimensional depiction of a surface). In the machine-tool sector, it is preferred to select the interpolator-side target or actual positions for the three coordinates, thereby automatically producing a three-dimensional workpiece contour. This yields the capability of considering the control program or programs either in relation to a three-dimensional image of subsystem parameters, or in relation to a three-dimensional image of subsystem parameters, or in relation to a three-dimensional image of the workpiece contour or in relation to motion paths, and carrying out optimizations to the control program or programs and/or to the machine, so that the subsystem parameters or workpiece contours are within their permissible tolerance ranges.

Visualization is preferably also accomplished with the use of an additional signal that is used for visual identification of a segment within the multidimensional contour or for identification of a segment on the display means, and that is represented by further data sets. It is thus possible, for example, for the parameters (e.g. motor currents) relevant in terms of a subsystem to be overlaid onto a three-dimensional workpiece contour or other contour or motion path, more or less as a fourth dimension, on the workpiece contour or path, while in addition a visual cross-reference to the control program or programs is also created. By preference, a selection means is used which serves to select the additional signal from a plurality of additional signals and organizes these selectable additional signals, in particular hierarchically.

The method is preferably carried out with the use of a data network, in particular an intranet and/or the Internet. By means of a portal, all method features can thus be made available for remote access, for example in conjunction with a remote condition monitoring system.

The following applications, among others, are recommended for the method:

monitoring production accuracy of the device;

cycle time monitoring and/or cycle time analysis;

energy consumption monitoring and/or energy consumption analysis;

optimization and/or monitoring of at least one process executing on the device, in particular monitoring in terms of process stability and/or process reliability;

monitoring and/or evaluation of device condition;

evaluation of the condition of at least one subsystem of the device;

evaluation of the condition of at least one subcomponent of the device.

An apparatus according to the present invention serves chiefly for implementation of one of the aforementioned applications in combination with a process executing on the device. An apparatus according to the present invention also comprises, in addition to a display means, a means with which, utilizing at least one first and one second data set characteristic of the process, a visualization of the data sets can be implemented in such a way that a visual cross-reference between data-set segments that are relevant to the process can be depicted on the display means. The device is preferably a processing machine or a machine tool for machining a workpiece.

The device comprises at least one intelligent subsystem participating in process execution (e.g. having the capability of recording data sets) and/or one machine component (e.g. mechanical units such as transport carriages, arms, and the like). At least one data set serves for characterization of the present condition of the subsystem and/or of the process to be controlled and/or of the component. By preference, at least one data set comprises data for visualizing the conditions of the intelligent subsystem and/or of the component on the display means, such that a preparation means handles preparation of the data sets, and said means is connected to the display means for depicting the prepared data sets. Additionally provided is a selection means that serves for selection of at least one data set from a plurality of data sets depictable on the display means, such that data preparation can be carried out in consideration of at least one of said data sets. The data sets can be depicted in a manner organized in the form of a dependency structure. The advantages resulting therefrom may be gathered from the explanations already given in connection with the method. Also present, advantageously, is an editing device with which the data sets can be edited and thus quickly modified.

Also provided is a measuring means for acquiring at least one data set, which means is in communication with the data preparation means for data exchange, and can acquire measured data of the process or control-system-side conditions or from associated device components, and forward them to the data preparation means. A very wide variety of visual cross-references between the data sets can thus be created very flexibly.

The measuring means is preferably a software tool for recording and visualizing process-relevant data within, for example, an intelligent subsystem. The recording mechanisms necessary therefor can be implemented very largely within the subsystem (such as, for example, a drive, an SPC, a robot control system, a measurement machine, a tool monitoring system, etc.), and allow the acquisition, for example in addition to execution times, of e.g. NC blocks within the geometry sequence (essentially block interpretation, block preparation, and block execution), also of data such as contour errors, motor currents, path speed, or input/output signals of an SPC. The tool is capable of displaying the instrumentally acquired information, for example, in the form of a tabular display, as an NC block display, and/or as an NC block analysis (e.g. Gantt chart). An oscilloscope function for visual depictability of recorded measured values is likewise implemented.

Cycle time analyses, optimizations, monitoring actions, and the like can be carried out by means of the tool. In addition to the signals supplied by a cycle time analysis, it is likewise possible to implement signal combinations and also to display signals derived from the recorded measured values (e.g. derivative over time: d/dt). The acceleration deviation, for example, could be calculated from the target and actual positions of a shaft and visualized.

The user can, for example, cause the following functions or signal combinations to be carried out:

$Sig = d\text{Signal}\_i(t) + d\text{Signal}\_i(t)$ $Sig = d\text{Signal}\_i(t) - d\text{Signal}\_i(t)$ $Sig = d\text{Signal}\_i(t) * d\text{Signal}\_i(t)$ $Sig = d\text{Signal}\_i(t) : d\text{Signal}\_i(t)$ $Sig = d\text{Signal}(t)/dt$ (and multiple utilization)

$Sig = \int \text{Signal}(t) dt$ (and multiple utilization)

$Sig(f) = FFT(\text{Signal}(t))$ (transferring a signal from the time region into the frequency region)

A variety of mathematical functions can in turn be applied to the resulting signals. The signals can be cross-referenced to other data sets, such as the control program or the process result, for example the workpiece surface, or to the motor current or spindle rotation speed and the like.

The apparatus preferably comprises means for implementing operation and/or visualization with the use of a data network, in particular an intranet and/or the Internet. Remote maintenance, remote analysis, remote optimization, monitoring of processes or executions or operations and/or of participating intelligent subsystems or device components can thereby be implemented. All the aforementioned applications could thus be executed remotely.

BRIEF DESCRIPTION OF THE DRAWINGS

The Figures that follow are purely schematic in nature. The explanations that follow comprise details that can be freely combined with features from the description above and/or from the claims.

DETAILED DESCRIPTION OF THE INVENTION

Figure 1:
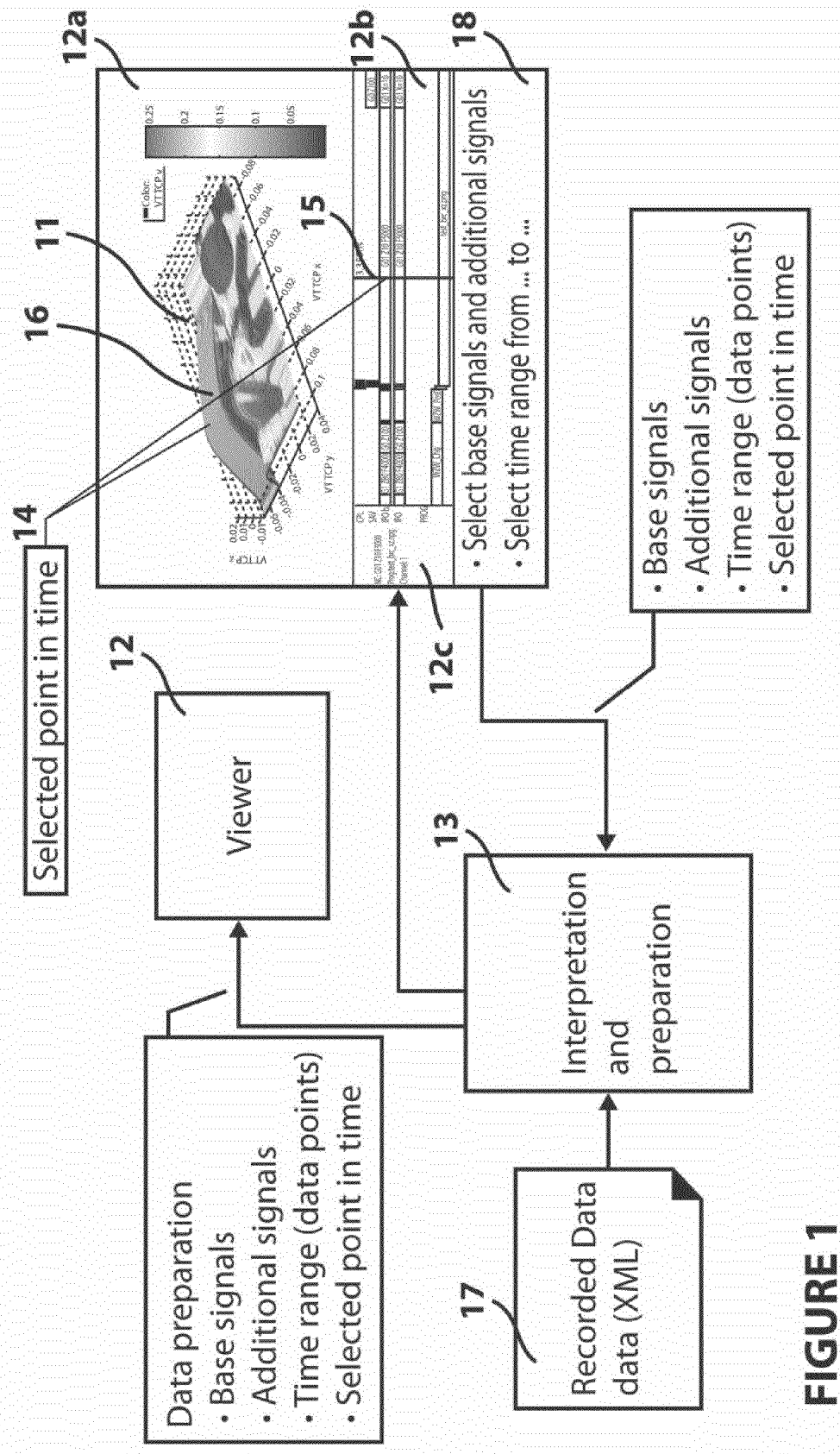
FIG. 1 schematically shows the architecture of an apparatus according to the present invention.

FIG. 1 shows, in highly schematic fashion, the components of an apparatus according to the present invention, for example a device for implementing a controlled sequence of, for example, a processing machine. A processing machine of this kind can be a machine for processing a workpiece 11, in particular a machine tool.

The apparatus according to the present invention is equipped, inter alia, with a display means 12 that can comprise multiple subregions 12*a, b, c* which themselves can be further divisible. For implementation of the apparatus according to the present invention, a processing means 13 is provided for the preparation and interpretation of data. Processing means 13 is connected to display means 12 in such a way that processed or interpreted data are transferable between processing means 13 and display means 12. Processing means 13 also has access to a data pool 17 that can, for example, comprise recorded data. These can be, for example, recorded data that can represent the operating parameters of the components associated with the intelligent subsystems, for example a chip conveyor or a unit for circulating the cooling lubricant.

Subregions 12*a, b, c* serve for better clarity, and serve here to visualize workpiece 12*a*, to visualize control program 12*b* for a control system for operation of an automation device, and to visualize operations 12*c* internal to the control system. Multiple control system programs and/or multiple workpieces can also be visualized, if necessary, by means of subregions 12*a, b, c* that can internally be further divisible. For example, the control programs of multiple control channels of a numerical control system, of one or more SPC units (e.g. associated step sequences), or of other intelligent subsystems such as, for example, a drive having an integrated SPC, can be visualized.

A selection means 18 is also provided. Selection means 18 serves to configure display means 12*a, b, c* and processing means 13 in such a way that the information to be visualized (base signals, additional signals, time regions) is selectable. A connection exists for this purpose between processing means 13 and selection means 18. The process-relevant data sets between which a cross-reference is to be created are selectable by means of selection means 18. One part of selection means 18 could, for example, also be a zoom function with which specific data sets can be analyzed in more detail.

By means of processing means 13, using at least one first and one second data set characteristic of the process sequence, a visualization of the two data sets is prepared so that a visual cross-reference 15, 16 between those segments of the visualized data sets relevant to the process sequence is depictable on visualization means 12*a, b, c*. A first data set can comprise, for example data for graphic (two- or three-dimensional) depiction of a workpiece 11 within first subregion 12*a* of the display means. These data can derive, for example, from a virtual machine by means of which, in conjunction with a machine control program, a virtual workpiece 11 was initially generated. Alternatively or additionally, however, these can also be data that were generated by means of a subsystem by instrumental sensing of a real workpiece 11, the real workpiece 11 having actually been manufactured by means of the control program. By preference, however, for reasons including cost, the procedure based on the virtual machine is used. A second data set can comprise, for example, a machine control program that is responsible for the workpiece processing operations. The depiction of the machine control program involves, in particular, the visualization of DIN code for a numerical control system, the program code (in the form of NC blocks) being visualized in the context of visualization at least partially within second region 12*b* of display means 12. In addition, information internal to the control system and relevant to the program code is depicted in subregion 12*c* of display means 12. Information with respect to the processing timing of the individual program code lines can also be depicted.

According to the present invention, a visual cross-reference 15, 16 is created between program code segment 15 (mentioned here by way of example) for the machine control system and the workpiece surface 16 to be processed by means of said program code segment 15. It would be possible, for example as indicated in 12*b*, to navigate through the control program by means of a cursor 15, and the associated reference point 16 would then be visualized (in this case, for example, by means of a black dot) in the other subregion 12*a* of display means 12.

With this apparatus according to the present invention, the program code developer, initial startup personnel, or machine operator has the capability of performing program code optimizations and preventing, at an early stage, faults and/or inaccuracies on the workpiece that were caused by an unoptimized or faulty program code or defectively operating subsystems and/or components (e.g. defective tool length correction). This can occur in advance, before a workpiece has actually been manufactured. The same thing can also happen on a real machine during initial machine or process startup, or can be used repeatedly to realign the process or to compensate for corresponding errors of the machine and/or of individual subsystems and/or components.

Alternatively to the workpiece surface or alternatively to path motions using the target axial positions in the interpolator in the X, Y, and Z direction, other data sets from other intelligent subsystems (that, in particular, have the same time base) can also be depicted multidimensionally, so that a cross-reference 15, 16 can be created between those data sets and at least one control program. For example, internal communication protocol data, actual position data, axial contour errors, control channel data, target and actual motor currents, speeds, accelerations of processing axes or spindle axes or of machine components or drive components and the like, or I/O states of components connected to SPC units, and data derivable or otherwise calculable from said data, could be taken into account in the visualization and/or creation of cross-references 15, 16.

Measured variables or data from real or virtual machine subsystems could also be taken into account. For acquisition of these measured variables, there is provided on each intelligent subsystem, to the extent possible, a measuring means according to the present invention that can be connected (not shown) to processing means 13 for data exchange, and can exchange data. A measuring means is capable of acquiring all the measured variables already recited above, for example motor currents, axial speeds, rotation speeds, accelerations, contour errors, I/O states of the SPC, etc, and exchanging them with data interpretation and preparation means 13. Using the recorded variables, preparation means 13 is capable of calculating derived variables or even carrying out calculations of greater complexity, for example energy consumption using the voltage and current variables, or geometrical deviation from target positions with the aid of the relevant axial contour error and the respective surface vector.

The following depiction possibilities, among others, are conceivable in first subregion 12*a* of display means 12:

Two-Dimensional Diagrams (One or Two Base Signals)
- One measured signal plotted against time or a base signal (similarly to an oscilloscope, also multi-channel with multiple measured signals)
- Contour diagrams of path motions (e.g. in conjunction with generation of a workpiece surface) by means of two base signals
- One color-labeled measured signal overlaid onto two base signals.

Three-Dimensional Diagrams (Up to Three Base Signals)
  Contour diagrams of path motions (e.g. in conjunction with generation of a workpiece surface) by means of three base signals
  Up to three measured signals, plotted against time or a base signal.
Four-Dimensional Diagrams (Three Base Signals)
  At least one additional signal that is overlaid within a three-dimensional diagram, preferably in color-labeled fashion, onto the path motion (workpiece surface), for example a drive-relevant signal or variables derivable therefrom, for example electrical power consumption.

In time-synchronous fashion with the aforementioned depictions and/or with the control program, further depiction forms such as, for example, Gantt charts, tabular depictions, bar charts, oscilloscope displays, etc. can also occur or be overlaid.

The user of the apparatus according to the present invention has the capability of manually selecting (for example, graphically by way of markings on a path that has been traveled or on the workpiece surface) a region or a segment on a workpiece surface that is visualized, for example, in three dimensions. By means of a selection means or a cursor, for example using the cursor keys of the computer keyboard or a pointing apparatus (e.g. mouse, trackball, etc.), the user can move along the contours of workpiece 11 that are displayed on display means 12a. Second subregion 12c displays that data set (e.g. NC block) which now has a relationship to the aforementioned workpiece surface discussed by way of example.

A zoom function (not shown) is also available to the user. Within workpiece surface 11 mentioned by way of example, a segment can thus be selected and its depicted size can be modified so that details of workpiece surface 11 can be viewed in more detail. In the same way, segments of at least one control program can also be analyzed in detail in accordance with requirements. Also conceivable, optionally, would be a linkage between the two zoom functions so that they mutually influence one another.

Figure 2:
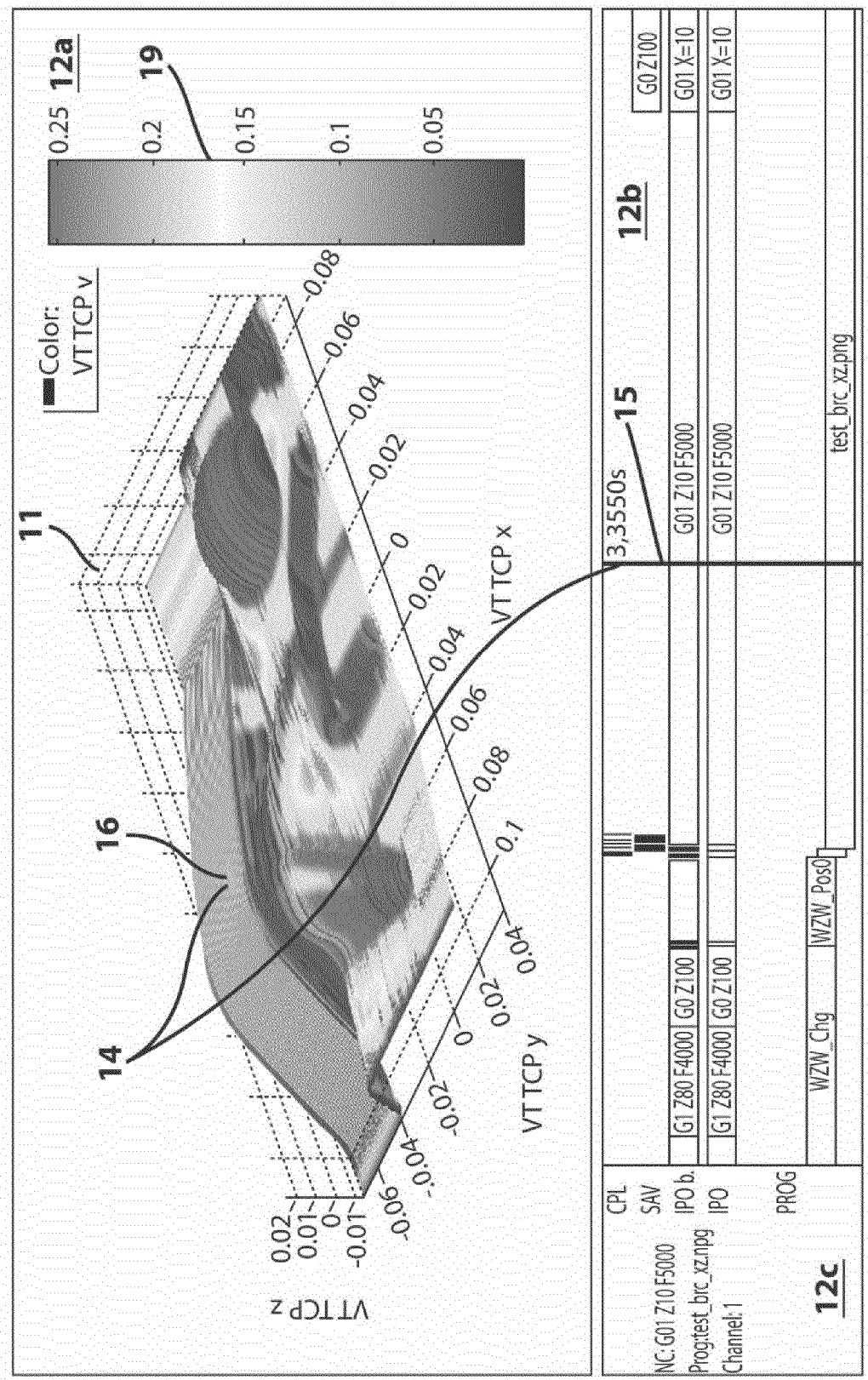
FIG. 2 shows, in more detail, the display apparatus known from FIG. 1.

FIG. 2 shows by way of example, in somewhat more detail, how a cross-reference 15, 16 between the data set for visualization of a workpiece surface 11 and a program code could be depicted utilizing subregions 12a, b of display means 12.

The data sets, created using a virtual and/or real machine and at least one control program, are processed in order to depict a three-dimensional image of the apparatus according to the present invention (e.g. interpretation and preparation 13), and depicted three-dimensionally in first region 12a of the display means, in this case by means of three signals (X, Y, Z axes).

The three base signals (X target, Y target, and Z target) used for technical implementation of the depiction of workpiece 11 are picked off from the motions of processing axes X, Y, Z on the associated control system or the relevant interpolator. Alternatively, instead of these three base signals, any other signals (or variables derived or calculated therefrom) could be used, so that instead of workpiece 11, any desired three-dimensional contours could be depicted. A further, fourth variable could be overlaid in color onto these contours. It would be conceivable, for example, to overlay selectably and in color, onto the three-dimensional contour of derived actual axial positions, actual axial speeds X', Y', and Z', or actual axial accelerations X", Y", and Z", a further variable such as the actual torque of the processing spindle.

Surface segments, regardless of the base signals from which they are generated, can be overlaid in various colors (shades of gray in the image) by means of additional signals; by means of each color, a datum relevant to the viewer could be overlaid in coded fashion as, so to speak, a fourth dimension. This coding could involve, for example, the depiction of any recorded signals, and variables derived or calculated therefrom, that must be within a specific tolerance range. It would thus be possible by means of the colors, as applicable, to identify errors brought about by machine dynamics or programming errors, component errors, etc. and make them visible at those points on the workpiece surface at which a signal has assumed a corresponding (critical) state. By means of color code bar 19 on the right in the Figure, each color (shades of gray in this case) could have a specific tolerance range or dynamic range for the signal or parameter assigned to it, so that the user can also quickly associate a numerical value with each color and obtains a rapid overview of the extent of any deviations from predefined target values.

By means of this information, it would be possible to detect immediately when measured signals, or variables derived or calculated therefrom (for example, the geometric error on the workpiece) exceed a predefinable tolerance range. An exceedance of this kind might be attributable to a defectively operating machine component or to a defectively operating subsystem. By means of the invention, an unequivocal cross-reference can now be created between the condition of a selectable machine component or the condition of a selectable subsystem at a specific point in time, and the path or workpiece surface generated at that point in time. An impermissibly high spindle torque during finish machining, for example, might cause a defect on the workpiece or indicate such a defect.

The user can conveniently select the base and additional signals, as well as any time regions optionally to be depicted, using selection means 18.

A segment 12b of an NC block is shown in the lower region of FIG. 2. This program segment 15 is responsible for implementation of the marked segment 16 of workpiece contour 11 (at the top of the image), since this program segment 15 applies control to the machine's spindles that are used to process workpiece 11.

Instead of an NC block, any other program code of an intelligent subsystem, for example the program code of robot control systems or of stored-program control systems (SPC), can of course also be overlaid and visualized according to the present invention, so that, for example, cross-references between robot motions and workpiece surface 11 that is manufactured, or a part to be bent or assembled, etc., can also be created.

In this example, a specific segment 16 on the workpiece surface indicates, for example, a deviation from the target dimensions and is marked by a dot 16. The user thereby immediately has a reference to control program segment 12b that is being executed during the manufacture of the marked workpiece contour 11. The operator recognizes, for example, that NC block "G0 Z100" is followed in time not only by several NC blocks not visible because of the time segment selected in 12b (gray or black partial bars), but also by NC block "G01 Z10 F5000," and that marked segment 16 on the workpiece contour has obviously been produced during execution of the latter NC block. The apparatus identifies this visually (15) in subregion 12b of display means 12 by means of a vertical bar.

The user likewise recognizes, by means of subregion 12c, the condition of the NC block preparation system (SAV) and the condition of the interpolator (IPO). The user also recognizes whether or not a motion was stipulated by the IPO at the point in time at which the relevant workpiece segment 16 was processed by means of NC block 15. This allows the user not only to locate a relevant code line in the control program (PROG) for a specific workpiece segment 16, but also to analyze how the program code was executed within the control system.

While the CPL code (=customer programming language, a high-level language based on BASIC) is initiated and calculated in the context of block preparation, for example for the calculation of contour starting points and end points, the interpolator determines the intermediate points to which the tools are actually to travel. If, for example, a delay in block preparation then occurs, caused e.g. by data memory accesses, this generally also results in delays in interpolation. This timing information can likewise be depicted in display means segment 12b, preferably by means of bar charts or Gantt charts. The user thus has the additional capability of optimizing and influencing the execution over time of the program code in the control system. This can reduce cycle times or optimize the process. It would thereby be possible, for example in the context of laser machining of a workpiece, to avoid unnecessary material heating of the workpiece and to accelerate the machining process.

The user additionally learns from display means segment 12c that the executed program code is stored in the file "test_brc_xz.npg." This allows the source code to be located quickly in a file system for debugging.

The user preferably also has the capability of calling, modifying, and saving the control program, using an editor, directly from display 12b. The user can immediately instruct workpiece contour 11 to be recalculated, so that the effects of the changes can be checked contemporaneously. In this context, the editor takes over access to the program file entirely automatically. This solution thus allows the user to proceed quickly if there is a need for optimization of the control program.

Figure 3:
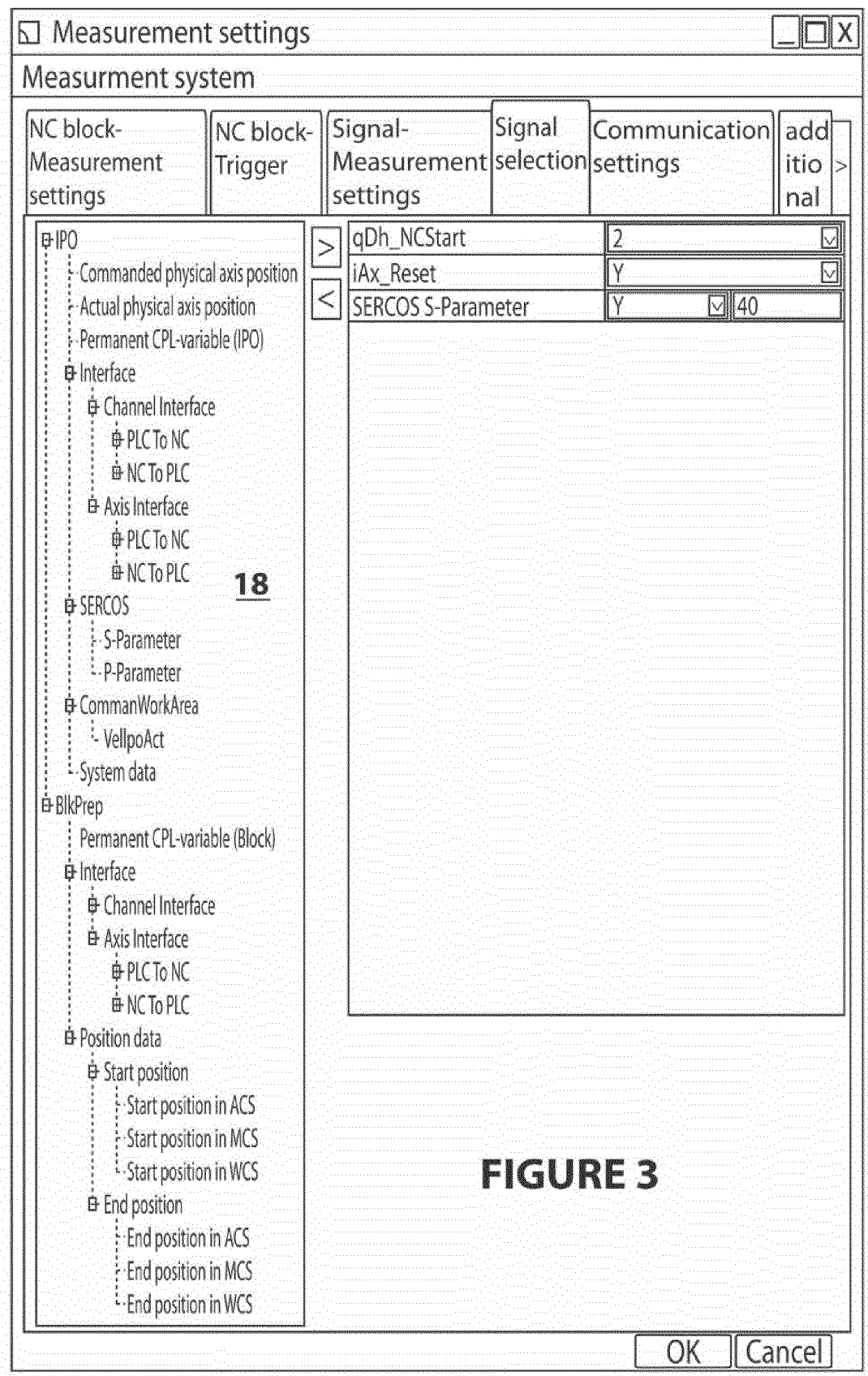
FIG. 3 shows the selection means of the apparatus according to the present invention.

FIG. 3 shows how the data sets are graphically structured for selection by means of selection means 18. The data are hierarchically organized in the form of a tree (in consideration of the existing dependencies). The base signals and additional signals can easily be selected using, for example, so-called pulldown menus. This hierarchical structure can also be linked to other depictions or graphics, for example to the user interface of a control system or of a processing machine.

What is claimed is:

1. A method for monitoring, analyzing, and/or optimizing at least one motion controlled process executing on a motion controlled automated device, the method comprising the steps of:
   recording, in real-time, at least one first data set and at least one second data set, each of the first and second data sets being related to the at least one motion controlled process;
   displaying the at least one first data set and the at least one second data set on a display;
   wherein the automated device comprises at least one intelligent subsystem participating in the at least one motion controlled process, and the second data sets is used to perform one or more of the following: to characterize the condition, and to depict at least one parameter, of the at least one intelligent subsystem;
   wherein the first data set comprises data for visualizing at least one motion controlled process result, whereby the at least one motion controlled process result is visualized on the display, the at least one motion controlled process result including a contour of a multidimensional surface of a work-piece; and
   wherein the displayed second data set is overlaid with surface segments of the contour of the multidimensional surface of the work-piece;
   wherein the at least one motion controlled process is controlled by numeric control (NC), robot control (RC), or motion control (MC).

2. The method according to claim 1, wherein the at least one data set comprising data for visualizing the at least one motion controlled process result is based on a simulation of the at least one motion controlled process performed using a virtual device.

3. The method according to claim 1, wherein the at least one data set comprising data for visualizing the at least one motion controlled process result is based on measurements taken upon using a real device to carry out the at least one motion controlled process.

4. The method according to claim 1, wherein the at least one intelligent subsystem is a control system, and one of the data sets is a control program executable by the control system.

5. The method according to claim 4, wherein the control program includes program code having individual program code lines, the program code being visualized at least in blocks of program code lines.

6. The method according to claim 4, wherein the control system controls a virtual device and exchanges data sets with the virtual device, and wherein the exchanged data sets can also be taken into account in the visualization.

7. The method according to claim 4, wherein changes can be made to the control program by an editing device to directly influence the at least one motion controlled process.

8. The method according to claim 1, wherein the data sets to be taken into account in the visualization are hierarchically organized and selectable by a user.

9. The method according to claim 1, wherein at least one of the data sets is ascertained by a measuring means and is collected by a data collection device.

10. The method according to claim 9, wherein at least one of the data sets acquired by the measuring means comprises measured variables and/or parameters selected from the group consisting of control system-specific data, motor currents, axis data, rotation speeds, accelerations, contour errors, energy consumption data, position data, communication protocol data, control channel data, speed data, acceleration data, and data derivable from the foregoing.

11. The method according to claim 1, wherein the automated device comprises a device component, and at least one of the data sets characterizes a condition of the device component.

12. The method according to claim 1, wherein the visualization occurs with the use of at least three base signals.

13. The method according to claim 12, wherein the at least three base signals represent the at least one motion controlled process result as the contour of the multidimensional surface.

14. The method according to claim 12, wherein the base signals represent parameters of a subsystem or a device component, and wherein the parameters can change during the at least one motion controlled process.

15. The method in accordance with claim 12, wherein the visualization occurs also with the use of at least one additional signal that serves for visual identification of a segment on the display means and is represented by at least one further data set.

16. The method in accordance with claim 15, further comprising the steps of selecting the at least one additional signal from a plurality of additional signals, and organizing the plurality of additional signals hierarchically.

17. The method in accordance with claim 1, wherein the method is carried out using an intranet data network and/or the Internet.

18. The method in accordance with claim 1, wherein the method is used for at least one purpose selected from the group consisting of monitoring the production accuracy of the automated device, monitoring cycle time of the at least one motion controlled process, analyzing cycle time of the at least one motion controlled process, monitoring energy consumption during the at least one motion controlled process, analyzing energy consumption of the at least one motion controlled process, optimizing the at least one motion controlled process for stability and/or reliability, monitoring the condition of the automated device, monitoring the condition of at least one subsystem of the automated device, and monitoring the condition of at least one subcomponent of the automated device.

19. An apparatus for monitoring, analyzing and/or optimizing at least one motion controlled process executing on a motion controlled automated device, the apparatus comprising:
 a processing means (13) for implementing a visualization of at least one first and one second data set, each data set being characteristic of the at least one motion controlled process; and
 display means (12) connected to the processing means for displaying the visualization to an operator;
 wherein the automated device comprises at least one intelligent subsystem participating in the at least one motion controlled process, and the first data set is used to characterize the condition, and/or to depict at least one parameter of the at least one intelligent subsystem or of the at least one device component with respect to a time base;
 wherein the second data set comprises data for visualizing at least one motion controlled process result, including a contour of a multidimensional surface of a work-piece, whereby the at least one motion controlled process result (11) is visualized on the display means (12); and
 wherein the at least one motion controlled process is controlled by numeric control (NC), robot control (RC), or motion control (MC);
 wherein the displayed first data set is overlaid with surface segments of the contour of the multidimensional surface of the work-piece.

20. The apparatus in accordance with claim 19, wherein the processing means (13) prepares the data sets for depiction by the display means (12).

21. The apparatus in accordance with claim 20, further comprising a selection means (18) connected to the processing means (13) for selection of at least one data set from a plurality of data sets depictable on the display means (12), wherein data preparation is carried out by the processing means in consideration of the selected data set or data sets.

22. The apparatus in accordance with claim 21, wherein the selection means (18) is operable to depict selected data sets organized in the form of a dependence structure.

23. The apparatus in accordance with claim 19, further comprising an editing device operable to edit the data sets.

24. The apparatus in accordance with claim 19, wherein at least one measuring means (17) for acquiring at least one data set from the automated device and/or from at least one intelligent subsystem of the automated device is connected to the processing means (13) for data interchange therewith.

25. The apparatus in accordance with claim 19, further comprising means for connecting to an intranet or the Internet, whereby monitoring, analyzing and/or optimizing at least one at least one motion controlled process executing on an automated device can be carried out at a remote location from the automated device.

26. A control system comprising an apparatus in accordance with claim 19.

27. An electrical drive comprising an apparatus in accordance with claim 19.

28. A machine tool comprising:
 a control system including an apparatus for monitoring, analyzing and/or optimizing at least one at least one motion controlled process executing on the machine tool, the apparatus comprising a processor (13) for implementing a visualization of at least one first and one second data set, each data set being characteristic of the at least one motion controlled process; and a display (12) connected to the processor for displaying the visualization to an operator; and
 wherein the automated device comprises at least one intelligent subsystem participating in the at least one motion controlled process, and the first data sets is used to characterize the condition, and/or to depict at least one parameter of the at least one intelligent subsystem or of the at least one device component with respect to a time base;
 wherein the second data set comprises data for visualizing at least one motion controlled process result, whereby the at least one motion controlled process result (11) is visualized on the display (12); and
 wherein the displayed first data set is overlaid with surface segments of the visualized second data set;
 wherein the at least one motion controlled process is controlled by numeric control (NC), robot control (RC), or motion control (MC).

29. A machine tool comprising:
 an intelligent subsystem including an apparatus for monitoring, analyzing and/or optimizing at least one at least one motion controlled process executing on the machine tool, the apparatus comprising a processor (13) for implementing a visualization of at least one first and one second data set, each data set being characteristic of the at least one motion controlled process; and a display (12) connected to the processor for displaying the visualization to an operator;
 at least one control device arranged for controlling the intelligent subsystem;
 wherein the first data set comprises data for visualizing at least one motion controlled process result, including a contour of a multidimensional surface of a work-piece, the second data set being overlaid surface segments of the contour of the multidimensional surface of the work-piece on the display; and
 wherein the at least one motion controlled process is controlled by numeric control (NC), robot control (RC), or motion control (MC).

* * * * *